United States Patent [19]

Tipton

[11] Patent Number: 5,199,665

[45] Date of Patent: Apr. 6, 1993

[54] ELECTRONIC BAIT ALERT FOR A FISHING REEL

[75] Inventor: Steven M. Tipton, Tulsa, Okla.

[73] Assignee: Zebco Corporation, Tulsa, Okla.

[21] Appl. No.: 689,150

[22] Filed: Apr. 22, 1991

[51] Int. Cl.⁵ ............................................. A01K 89/027
[52] U.S. Cl. ................................... 242/305; 242/238
[58] Field of Search ............... 242/305, 225, 306, 238, 242/242

[56] References Cited

U.S. PATENT DOCUMENTS

| 2,145,929 | 2/1939 | Herman | 242/305 |
| 2,168,938 | 8/1939 | Klein | 242/305 |
| 3,275,260 | 9/1966 | Woolen | 242/305 |
| 3,481,554 | 12/1969 | Hull | 242/238 X |
| 3,836,092 | 9/1974 | Hull | 242/306 X |
| 4,650,161 | 3/1987 | Kaneko | 242/308 X |

FOREIGN PATENT DOCUMENTS 3514102 10/1986 Fed. Rep. of Germany ...... 242/306
2191071 12/1987 United Kingdom ............... 242/305

Primary Examiner—Daniel P. Stodola
Assistant Examiner—William Stryjewski
Attorney, Agent, or Firm—Wood, Phillips, VanSanten, Hoffman & Ertel

[57] ABSTRACT

An electronic bait alert for incorporation into prior art fishing reels having a spool for storing a supply of line and a drive train to direct the line onto the spool. The spool is rotatable to collect or to payout line and the drive train has a retrieve position A sensor produces an electric signal upon the payout of line with the drive train in the retrieve position An alarm produces a sensory indication of line payout in response to the electric signal. The alarm can be either an electric lamp, an electric buzzer or both. A switch can be included for turning off the electric bait alert.

16 Claims, 1 Drawing Sheet

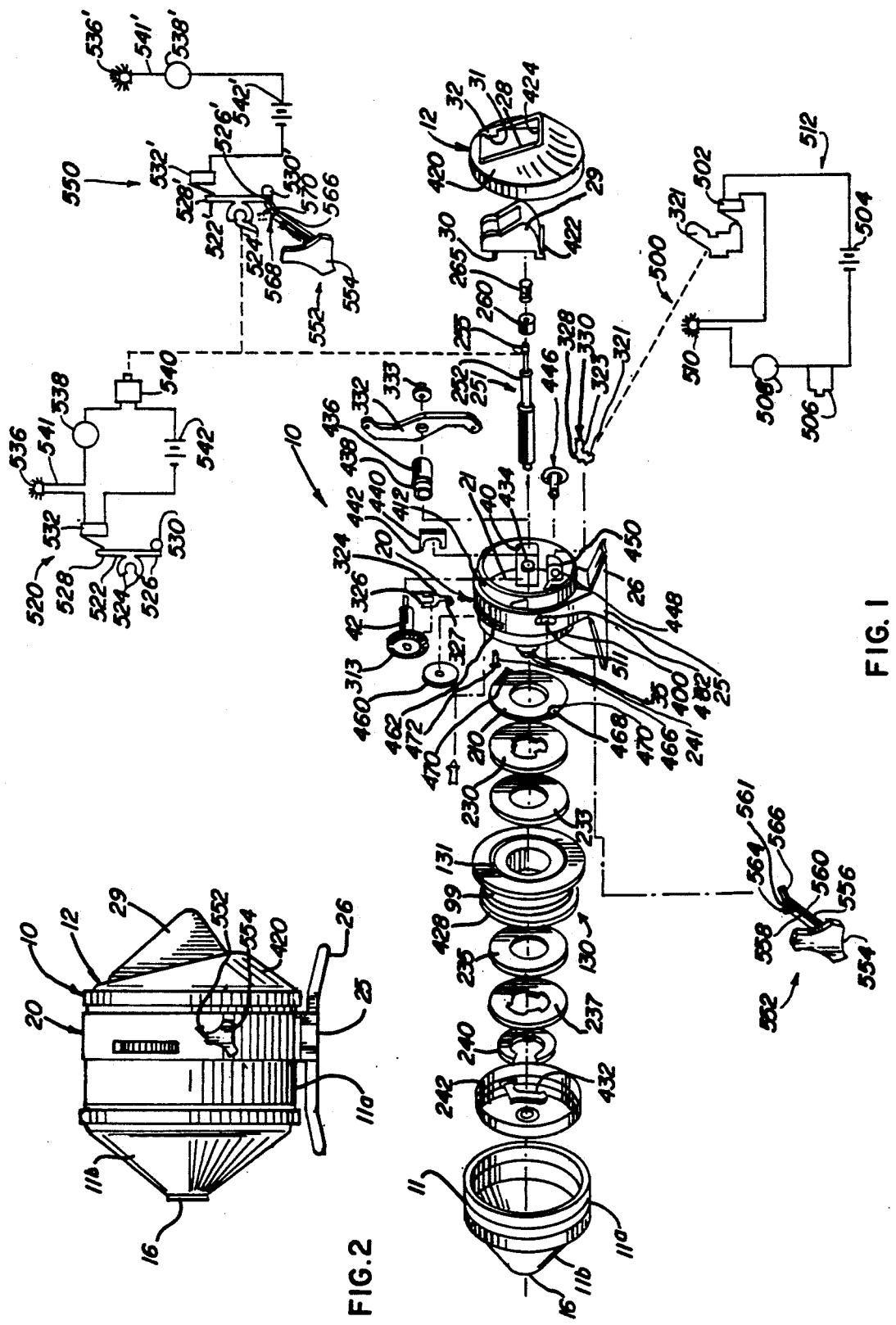

ELECTRONIC BAIT ALERT FOR A FISHING REEL

TECHNICAL FIELD

This invention relates to bait alerts on fishing reels, and more particularly, relates to an electric bait alert providing a visual and/or audible signal.

BACKGROUND OF THE INVENTION

Bait clickers or alerts are commonly employed on all types of fishing reels. Without a warning from the bait clicker, a user of a reel with a light drag setting might not otherwise be aware that the line is being drawn out either by a fish or because the bait is snagged. This is particularly a problem with today's smoothly and quietly operating reels.

It is know to provide mechanical clickers or alerts with elements that bear against a gear or the like that is rotated as the line is drawn from the reel or retrieved Because such structures depend upon rotation of the reel's drive train to produce the motion necessary to generate a clicking noise, such structures require that any anti-reverse mechanism be in a disengaged position for the clicker to operate.

Another significant drawback of the prior art mechanical bait alerts is the large number of mechanical parts which must be included in the structure to form the bait alert. The large number of parts not only increases assembly time and cost, but increases the chance of mechanical failure of the bait alert or the reel if one of the mechanical parts fails.

Yet another drawback of these prior art structures is that they generally can only produce audible warnings. Thus, such devices are unsuitable for the hearing impaired.

The present invention is directed toward overcoming one or more problems discussed above in a novel and simple manner.

SUMMARY OF THE INVENTION

The electronic bait alert of the present invention is intended for incorporation into prior art fishing reels having a spool for storing a supply of line and a drive train to direct the line onto the spool. The spool is rotatable to collect or to payout line The drive train has a retrieve position. A sensor produces an electric signal upon the payout of line with the drive train in the retrieve position. An alarm produces a sensory indication of line payout in response to the electric signal The alarm can be either an electric lamp, an electric buzzer or both A switch can be included for turning off the electric bait alert.

In another aspect of the above-described invention the drive train has a crank shaft rotatable in a first and a second direction When the crank shaft is urged to rotate in the first direction line is paid out from the spool and when the crank shaft is urged to rotate in the second direction line is collected on the spool. An anti-reverse assembly is provided for stopping the rotation of the drive train in the first direction The anti-reverse assembly causes the sensor to produce an electric signal when it stops the rotation of the drive train in the first direction.

Another aspect of the above-described invention includes a structure for frictionally maintaining an actuator in rotation with a center shaft of the drive train and under a predetermined force applied to the actuator the actuator slips relative to the center shaft. A mechanical stop is included for halting the rotation of the actuator when the drive train is rotated in the second direction The sensor is disposed to halt the rotation of the actuator when the center shaft is rotated in the first direction and when the sensor so stops the center shaft it produces the electric signal.

In yet another aspect of the above-described invention, an external mechanical switch having an engaged and a disengaged position is operatively associated with the actuator such that when the mechanical switch is in the engaged position, the actuator engages the mechanical switch and not the sensor when the center shaft is rotated in the first direction. When the mechanical switch is in the disengaged position, the actuator is free to engage the sensor when the center shaft is rotated in the first direction.

The electronic bait alert of the present invention requires few mechanical parts, therefore simplifying and reducing the cost of the assembly process and increasing the reliability of the electric bait alert our prior art devices In addition, the electronic bait alert of the present invention is extremely sensitive to forces causing payout of the line from the reel Moreover, one embodiment of the present invention permits the bait alert to be used with an anti-reverse assembly engaged Lastly, the electronic bait alert of the present invention provides a visual signal to anglers, making it well suited for the hearing impaired and allowing an angler to quickly identify which of several reels has engaged a fish, particularly at night.

Still other aspects, objects and advantages of the present invention can be obtained from a study of the specification, the drawings and the appended claims.

BRIEF DESCRIPTION OF THE DRAWINGS

FIG. 1 is an exploded perspective view of a conventional style reel into which the present invention is incorporated.

FIG. 2 is a left side elevation view of the assembled reel of FIG. 1.

DESCRIPTION OF THE BASIC STRUCTURE AND OPERATION OF THE FISHING REEL

Referring initially to FIG. 1, there is shown a reel 10 including a closed face housing having a reel body 20 to which is attached a front cup-shaped cover 11 and a rear cup-shaped cover 12. The front cover tapers radially forwardly from the cylindrical first part 11a to define a cone-shaped second part 11b. A circular line opening is provided in the conical second part 11b and mounts an annular line guide 16 in a conventional manner. The front cover 11 is removably attached with an annular rim 400 on the reel body 20 in a conventional manner. The rear cover 12 is removably attachable in a conventional manner with a rearwardly opening rim 412 associated with the back of the reel body 20.

The rear cover 12 has a sloped wall 420 defining a rectangular opening 28 for reception of a one-piece thumb button 29. The thumb button has a shape substantially mating with the shape of the opening 28 in the rear cover 12 and has a pair of sidewardly extending pivots 30 on the upper forward side edges thereof which engage in pivot openings 31 formed in the adjacent side walls 32 of the opening 28 A lip 422 extends laterally along the bottom edge of the thumb button 29. With the thumb button assembled from the inside of the cover 12, the pivots 30 are introduced to the slotted openings 31 in the walls 32 of the rear cover. The lip 422 abuts the edge 424 of the wall defining the bottom of the rectangular opening 28 to prevent the thumb button 29 from pivoting rearwardly out of the opening 28 in the rear cover 12.

The rear body 20 includes a transverse mounting plate or deck plate 21 and has an integrally molded, radially extending stem 25 with a mounting foot 26 on the outer end thereof for attachment to the appropriate part of a fishing rod (not shown).

A central hub 35 is formed with and projects forwardly of the deck plate 21 and receives in succession a drag plate 210, back spool washer 230, back flat drag washer 233, spool assembly 130, front flat drag washer 235, front spool washer 237, all of which are retained on the hub 35 by means of a spool retainer clip 240 which fits into a groove aligned with a shoulder separating the hub 35 240.

A centershaft 251 is slidably and rotatably mounted in a bore extending through the deck plate 21 and hub 35, with a spinner head assembly 242 threaded onto the forward threaded end of the shaft 251. The spinner head assembly 242 partially surrounds the forward flange 428 of the spool assembly 130 with a supply of fishing line 99 being wound on a spool 131 of the spool assembly 130. A pinion gear 260 is splined on a reduced diameter splined portion 252 of the centershaft 251 and is resiliently maintained in a forward position against the deck plate 21 by a centershaft spring 265 bearing against a stop 255 on the centershaft The splined connection between the pinion gear 260 and centershaft 251 permits the axial sliding motion of the shaft 251 relative to the pinion gear 260 while at the same time rotation of the pinion gear 260 will rotate the centershaft 251.

Depressing the thumb button 29 moves the centershaft 251 and spinner head assembly 242 forward relative to the hub 35 to retract a pickup pin mechanism 432, mounted on a spinner head assembly 242. Manipulating the thumb button in a conventional manner will provide a braking action to halt line payout, will permit casting of the line or will permit the drive train to be in a retrieve position.

The deck plate 21 has a rearwardly projecting boss 40 with a laterally directed bore 434 for reception, in a concentric manner, of a crankshaft 42, surrounded by a cylindrical sleeve bearing 436 The bearing 436 has an annular groove 438 which, with the bearing properly aligned on the reel body 20 is in planar alignment with a slot defined at the rear of the deck plate 21 within a radially inward extension of the boss A clip 440 surrounds the sleeve bearing 436 and resides within the groove 438 with forwardly projecting legs 442 of the clip 440 entering the slot in the deck plate 21. This arrangement assures proper positioning of the sleeve bearing 436 and prevents any lateral shifting thereof.

The crankshaft 42, with a main pinion gear 313 attached at one end is rotated in the sleeve bearing 436 in the boss 40 and had a handle 332 attached by means of a nut 333 to the other end of said crankshaft 42. The gear 313 meshes with the pinion gear 260 on the centershaft 251 so that rotation of the crank handle 332 will rotate the centershaft 251 and spinner head assembly 242.

An anti-reverse assembly 330, which is associated with the crankshaft 42, includes a ratchet (not shown in FIG. 1) fixed on the back of the gear 313 for rotation with the gear 313 and crankshaft 42. The anti-reverse assembly 330 includes a pivotable pawl 321, a pawl actuator 324 and a control member 446. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the pawl 321. The pawl 321 will be situated with the pawl tooth 323 selectively aligned with the ratchet.

Independent, manual control of the pawl 321 is accomplished by the separate control member 446 mounted within a lateral bore 448 in a boss 450 spaced beneath the boss 40. The control member 446 is manipulable externally of the reel body. Clockwise rotation of the control member 446, as viewed in FIG. 1, will pivot the pawl about the pivot tab 322 out of engagement with the ratchet. Thus movement of the crank handle 332 in either a clockwise or counterclockwise direction by the user, with the pawl 321 manually disengaged by the control member 446, will not effect movement of the pawl 321 and thus clockwise and counterclockwise crankshaft rotation will be uninhibited by the pawl 321.

Counterclockwise rotation of the control member 446 will allow the pawl 321 to be moved freely between two limiting positions so that rotation of the crank handle 332 in a counterclockwise direction, as viewed in FIG. 1, will pivot the pawl out of alignment with the teeth of the ratchet, whereupon the crank handle 323 will be permitted to be rotated in that direction without interference. In addition, with the control member 446 in the counterclockwise position, rotation of the handle 332 in the clockwise direction moves the pawl actuator 324 in the clockwise direction with the tab 327 pivoting the pawl 321 in a counterclockwise direction to move the pawl into the path of the ratchet teeth to stop further rotation of the crankshaft 42 and handle 332 in that direction.

Drag actuation is effected by a knurled drag wheel 460 which is captured in and protrudes through a slot 462 beyond the outer surface of the reel body 20. The wheel 460 has a threaded bore and is suspended for rotation by a longitudinally directed bolt 466 extending through the spaced walls flanking the wheel 460.

The drag washer 210 has a substantially flat body 468 and had diametrically opposed tabs 470 bent perpendicularly in a common direction out of the plane of the body 468. The deck plate 21 has locating apertures for receiving each of the tabs 470. The one aperture is in direct alignment with the bolt 466 suspending the drag wheel 460. The forward end 472 of the bolt is slotted and is accessible through the one aperture to receive the one tab 40 of the drag plate 210.

This arrangement of the drag plate 210 prohibits rotation of the bolt 466 as the drag wheel 460 is manipulated. As a result, rotation of the drag wheel effects fore or aft movement of the bolt 460 relative to the reel body 20. Rotation of the wheel in a first direction forces the tab 470 and drag washer forwardly increasing drag breaking pressure on the spool 131. Retraction of the bolt 466 and reduction of the braking pressure is accomplished by rotation of the drag wheel 466 oppositely to the first direction.

DESCRIPTION OF THE PREFERRED EMBODIMENT

The spin cast reel described above is only exemplary of a reel within which the present invention can be incorporated. The inventive structure can be adapted to, for example, spinning, casting and other style reels.

The inventive structure is illustrated in FIG. 1. In a first embodiment of the bait alert structure 500, the bait alert 500 is mounted rearwardly of the deck plate 21 and consists of an electric pressure switch 502 in combination with an electric power source 504 or battery for producing an electric signal, a manually accessible electric switch 506, and an electric buzzer 508 and an electric light 510 responsive to an electric signal for giving a user of the fishing reel a sensory indication of line payout. The electric switch 506 is accessible outwardly of the reel body 20 through a bore 511 in the boss 482.

The electric pressure switch 502 is positioned rearwardly of the pivotable pawl 321 of the anti-reverse assembly 330. The bait alert 500 is only operative when the control member 446 of the anti-reverse assembly 330 is set in the "on" position as will appear more clearly below.

The pressure switch 502 is associated with the pivotal pawl 321 such that when the control member 446 is in the counterclockwise position, rotation of the handle 332 in the clockwise direction causes the pivoting pawl 321 to move in a counterclockwise direction whereupon the pawl engages the pressure switch 502, closing the pressure switch. As is readily apparent, if the manually accessible electric switch 506 is in the "on" or closed position, the series electric circuit 512 will be closed, permitting the buzzer 508 to sound and the electric lamp 510 to illuminate. Of course, if the control member 446 is in the clockwise position, the pivoting pawl 321 will not be pivotal in a clockwise direction and therefore the pressure switch 502 cannot be closed.

In a second embodiment of the present invention, the electric bait alert structure is illustrated at 520. An actuator 522 is located on the centershaft 251 adjacent the pinion gear 260 and is urged against the pinion gear 260 by the centershaft spring 256. The actuator 522 has bifurcated legs 524 which grip the surface of the centershaft 251 with sufficient force that the actuator 52 will rotate with the centershaft 251, but will slide relative to the centershaft 251 when the gripping force is exceeded. The actuator 522 also has a first and second cantilevered arms 526, 528 which extend from the bifurcated legs 524. A mechanical stop 530 is provided for engaging the first cantilevered arm 526 when the centershaft 251 and therefore the actuator 522 are rotated in a counterclockwise direction. An electric pressure switch 532 engages the second cantilevered arm 528 of the actuator 522 when the centershaft 251 and therefore the actuator 522 are rotated in a clockwise direction.

The electric pressure switch 532 is in combination with an electric power source 542 or battery for producing an electric signal An electric lamp 536 and an electric buzzer 538 are responsible to the electric signal for giving a user of the fishing reel a sensory indication of line payout A manually accessible electric switch 540 is a accessible outwardly of the reel body 20 through a bore 511 in the boss 482. The electric switch 532, the power source 542, the electric lamp 536, the electric buzzer 538 and the manually accessible electric switch 540 form series electric circuit 541. When the manually accessible electric switch 540 is in its closed position and the centershaft 251 is rotated in a clockwise direction the actuator 528 engages the pressure switch 532 closing the electric circuit 541 causing the electric lamp 536 to illuminate and the buzzer 538 to buzz.

A third alternate embodiment of the electric bait alert of the present invention is illustrated at 550. This third embodiment 550 has each of the elements described above with respect to the second embodiment 520 and each of the common elements and are indicated at 550 with the identical reference numbers including a prime to distinguish between the second and the third embodiments 520, 550. The third embodiment 550 recognizes that it may be desirable to turn off the electric bait alert 550 without incorporating the manually accessible electric switch 540 of the second embodiment 520. This is accomplished through an external mechanical switch 552. The mechanical switch 552 has an enlarged control pad 554 and an integral cylindrical body 556 for reception in a bore 511 in the boss 482 on the reel housing 20. The cylindrical body 556 has a first leg 558 and a second spaced longer leg 560. The legs project through the bore 511 in the boss 482 in substantially parallel relationship. The short leg 558 has a ramped surface 562 which, upon introduction of the cylindrical body 556 of the external mechanical switch 552 into the bore 511 deflects the short leg 560 toward the other leg 562 sufficiently to permit simultaneous entry of both legs into the bore 511. In the fully seated position, the leg 558 springs back and seats an associated shoulder 564 against the boss 482 to maintain the boss 482 captive between the shoulder 564 and the inwardly facing surface (not shown) of the enlarged head 554 of the mechanical switch 552. The second spaced longer leg 560 has a transverse member 566 which extends transversely from the second leg 560 at the end of the second leg 560 spaced from the control head 554. When the external mechanical switch 552 is in an engaged position, as illustrated in the third embodiment 550 at 568, the transverse member 566 will engage the first diverging arm 526' and prevent the actuator 522' from rotating in a clockwise direction and thereby preventing the second diverging arm 528' from engaging the electric pressure switch 532', thus keeping the electric circuit 541' open. However, when the external mechanical switch 552 is in an unengaged position 570 the actuator 522' is free to rotate in a clockwise direction with the centershaft 551 and thus the second diverging arm 528' may engage the electric pressure switch 532', closing the circuit and allowing the lamp 536' and the buzzer 538' to activate.

It should be understood, of course, that the specific forms of the invention illustrated and described herein are intended to be representative only, as certain changes and modifications may be made without departing from the scope and the teachings herein disclosed. Accordingly, reference should be made to the appended claims in ascertaining the full scope of the invention.

I claim:

1. In a fishing reel of the type having a spool for storing a supply of line, a drive train rotatable in a line payout and a line collection direction and means rotatable by rotation of said drive train in a line collection direction for directing line onto the spool, an electronic bait alert comprising:
   an actuator on the drive train, the actuator moving in a first direction in response to urging of said drive train in a line payout direction;

means for producing an electric signal only in response to said drive train being urged in a line payout direction and said actuator moving in said first direction and not in response to said drive train rotating in the line collection direction; and means responsive to said electric signal for giving a user of the fishing reel a sensory indication of the line being tensioned with a predetermined force to thereby avoid undetected line payout.

2. The bait alert according to claim 1 wherein said means for giving a user of the fishing reel a sensory indication is a lamp.

3. The electric bait alert according to claim 1 wherein said means for giving a user of the fishing reel a sensory indication is a buzzer.

4. The electric bait alert according to claim 1 wherein said means responsive to said electric signal for giving a user of the fishing reel a sensory indication is a buzzer and a lamp.

5. The electric bait alert according to claim 1 further including a switch, said switch having an open and a closed position, whereby when said switch is in said open position said electric signal cannot be produced and when said switch is in said closed position said electric signal can be produced.

6. In a fishing reel of the type having a spool for storing a supply of line and a drive train that is operable to direct line onto the spool, said drive train having a crank shaft rotatable in a first and a second direction, wherein said crank shaft is urged to rotate in said first direction as an incident of the line being tensioned and rotation of said crank shaft in said second direction directs line onto the spool, said fishing reel further including an anti-reverse assembly for stopping the rotation of said crank shaft in said first direction as an incident of the line being tensioned with a predetermined force, an electric bait alert comprising:

means engaging said anti-reverse assembly for producing an electric signal when said crank shaft is urged to rotate in said first direction but said rotation is prevented by said anti-reverse assembly; and means responsive to said electric signal for giving a user of the fishing reel a sensory indication that the crank shaft is being urged to rotate in said first direction but such rotation is being prevented by the anti-reverse assembly to thereby avoid undetected line payout.

7. The electric bait alert according to claim 6 wherein said means responsive to said electric signal for giving a user of the fishing reel a sensory indication means is a lamp.

8. The electric bait alert according to claim 6 wherein said means responsive to said electric signal for giving a user of the fishing reel a sensory indication is a buzzer.

9. The electric bait alert according to claim 6 wherein said means responsive to said electric signal for giving a user of the fishing reel a sensory indication is a buzzer and a lamp.

10. The electric bait alert according to claim 6 further including a switch accessible outwardly of said housing, said switch having an open and a closed position, whereby when said switch is in said open position said electric signal cannot be produced and when said switch is in said closed position said electric signal can be produced.

11. In a fishing reel of the type having a spool for storing a supply of line and a drive train that is operable to direct line onto the spool, said drive train having a center shaft rotatable in a first and second direction wherein said center shaft is urged to rotate in said first direction as an incident of the line being tensioned with a predetermined force and rotation of said center shaft in said second direction directs line onto the spool, an electronic bait alert comprising:

means responsive to rotation of said center shaft for producing an electric signal only when said center shaft is urged to rotate in said first direction and not when said center shaft is rotated in said second direction;

means responsive to said electric signal for giving a user of the fishing reel a sensory indication that the center shaft is being urged to rotate in said first direction to thereby avoid undetected line payout.

12. The electric bait alert according to claim 11 wherein said means responsive to said electric signal for giving a user of the fishing reel a sensory indication is a lamp.

13. The electric bait alert according to claim 11 wherein said means responsive to said electric signal for giving a user of the fishing reel a sensory indication is a buzzer.

14. The electric bait alert according to claim 11 wherein said means responsive to said electric signal for giving a user of the fishing reel a sensory indication is a buzzer and a lamp.

15. In a fishing reel of the type having a spool for storing a supply of lien and a drive train that is operable to direct line onto the spool, said drive train having a center shaft rotatable in a first and second direction wherein said center shaft is urged to rotate in said first direction as an incident of the line being tensioned with a predetermined force and rotation of said center shaft in said second direction directs line onto the spool, an electronic bait alert comprising:

means responsive to rotation of said center shaft for producing an electric signal only when said center shaft is urged to rotate in said first direction;

means responsive to said electric signal for giving a user of the fishing reel a sensory indication that the center shaft is being urged to rotate in said first direction to thereby avoid undetected line payout, wherein said means responsive to rotation of said center shaft for producing an electric signal comprises:

an actuator;

means for frictionally maintaining the actuator in rotation with said center shaft and under a predetermined force allowing said actuator to slip relative to the center shaft;

a mechanical stop for halting the rotation of said actuator when said center shaft is rotated in said second direction; and a switch halting the rotation of said actuatory when said center shaft is rotated in said first direction, said switch having a closed position and an open position, the action of the actuator upon said switch urging said switch into a closed position whereby said electric signal is produced.

16. The electric bait alert according to claim 15 further comprising:

a mechanical switch accessible outwardly of said housing, said mechanical switch having an engaged and a disengaged position, said mechanical switch being operatively associated with said actuator such that when said mechanical switch is in an engaged position said actuator engages said mechanical switch and not said switch and when said mechanical switch is in said disengaged position said actuator is free to urge said switch into said closed position when said center shaft is rotated in said first direction.

* * * * *